UNITED STATES PATENT OFFICE.

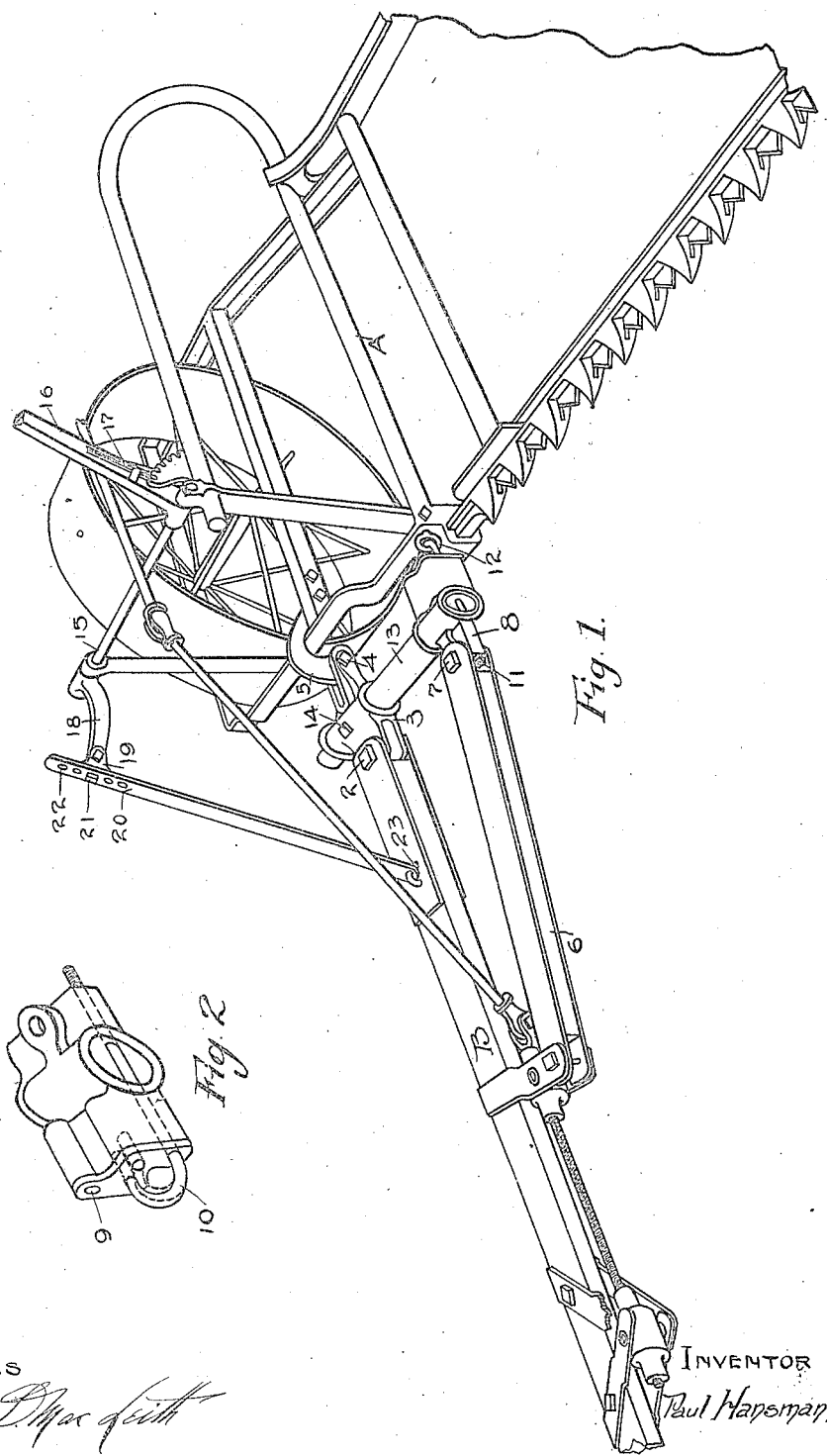

PAUL HANSMANN, OF LONG PRAIRIE, MINNESOTA, ASSIGNOR TO HANSMANN MANUFACTURING COMPANY, OF LONG PRAIRIE, MINNESOTA, A CORPORATION OF MINNESOTA.

STEERING APPARATUS FOR VEHICLES.

1,106,806.  Specification of Letters Patent.  Patented Aug. 11, 1914.

Application filed January 3, 1912. Serial No. 669,193.

*To all whom it may concern:*

Be it known that I, PAUL HANSMANN, a citizen of the United States, residing at Long Prairie, in the county of Todd and State of Minnesota, have invented certain new and useful Improvements in Steering Apparatus for Vehicles, of which the following is a specification.

My invention relates to improvements in steering mechanism for vehicles of that class in which the draft pole or tongue may be set at a position of angularity with reference to the vehicles, as where a plurality of binders or similar vehicles are to be drawn one behind another in offset position.

The invention herein consists particularly in improvements for adjusting the steering means to different types of binders, etc., and consists in the features of construction, combination, and arrangement of parts hereinafter described and claimed.

In the accompanying drawings forming part of this specification, Figure 1 is a perspective view of a binder broken away and embodying my invention; and Fig. 2 is a detail of an adjustable coupling forming part of my invention.

Referring to the drawings A represents the framework of the vehicle to be drawn and B the draft pole. The pole B has vertical pivotal support upon a coupling member 3, the coupling member 3 at its rear end having horizontal pivotal support 4 upon the arm 5 of the binder. Arranged at one side of the pole B is a bar 6 having adjustable connection at its front end with the pole, and at its rear end having vertical pivotal support 7 upon a coupling member 8, the opposite end of the member 8 having the following described connection with the vehicle frame. The coupling member 8 is formed with longitudinally extending openings 9, part or all of these openings extending from the rear end of the coupling entirely therethrough. A link pin 10 is adapted to be removably supported in adjacent ones of said openings, the link pin, as shown, being long enough to extend entirely through one of the openings 9 and project beyond the front end of the coupling to receive a securing nut 11, the rear end of said link being doubled upon itself to extend into one of the adjacent openings 9 as indicated in Fig. 2. The rear end of the link 10 is adapted to extend through an eye 12 suitably supported by the vehicle thus forming a loose pivotal connection between the coupling member 8 and said vehicle. The couplings 3 and 8 are connected by a pipe 13 slidably extending at one end through the coupling 3 and at its other end being anchored in the coupling 8, as by means of the link pin 10 passing through openings in the pipe. The pipe is adapted to be secured in set position in the coupling 3 by means of set screws 14 threaded through the coupling into engagement with the pipe.

The binder frame is adapted to be tilted through the medium of the transverse shaft 15 having journal support upon the frame, the shaft 15 being provided at one end with an actuating handle 16, controlled by suitable pawl and ratchet mechanism 17, and at its other end being formed with a forwardly extending arm 18. Having horizontal pivotal support in the end of the arm 18 is a bracket 19 upon the front end of which bracket is pivotally supported the upper end of the bar 20 through the medium of a pivot 21 extending through one of the openings 22, rearwardly into the bracket 19. The lower end of the bar 20 has swivel support 23 upon the pivoted end of the tongue B.

In operation the draft pole being set in a position of angularity to hold the attached vehicle in offset position, the bar 20 will swing upon its pivotal support 21 and swivel connection 23 with the pole to accommodate the bar 20 to the adjustment of the pole. In tilting the vehicle frame by the handle 16 the arm 18 will swing upon its pivotal connection with the bracket 19 connected with the bar 20. The draft pole, it will be evident, may be supported in tilted position by adjusting the bar 20 upon the bracket 19 through the medium of the pin 21 and openings 22.

In accommodating the draft pole and adjusting bar 6 to different types of vehicles I utilize the adjustability of the link pin 10 in connection with the openings 9 in the coupling 8, and the adjustability of the coupling 3 upon pipe 13. The pipe 13 serves as a strengthening and supporting cross bar for the couplings 3 and 8 of the draft pole and adjusting bar. It will be noted that the link pin 10 may be utilized to both vertically and horizontally adjust the connection of the coupling 8 with the vehicle.

I claim as my invention:

1. In combination with a vehicle, a draft pole having pivotal support thereon allowing vertical and horizontal swinging of the pole, an adjusting bar having pivotal support upon said vehicle at one side of said draft pole allowing it to swing in vertical and horizontal planes, means for horizontally adjusting the pivotal connection of said bar and said vehicle, and an adjusting connection between said bar and draft pole forward of the pivotal support of said bar.

2. In combination with a vehicle, a draft pole having pivotal support thereon allowing vertical and horizontal swinging of the pole, an adjusting bar having pivotal support upon said vehicle at one side of said draft pole allowing it to swing in vertical and horizontal planes, means for vertically adjusting the pivotal connection of said bar with said vehicle, and an adjusting connection between said bar and draft pole forward of the pivotal support of said bar.

3. In combination with a vehicle, a draft pole having pivotal support thereon to swing in vertical and horizontal planes, an adjusting bar having pivotal support upon said vehicle alongside said pole, said pivotal support consisting of a coupling, said bar having vertical pivotal support on said coupling and said coupling having adjustable pivotal support upon said vehicle, and an adjusting connection between said bar and pole.

4. In combination with a vehicle, a draft pole having pivotal support thereon, a bar having vertical pivotal support upon a coupling alongside said pole, a link 10 removably and adjustably supported in said coupling, means for pivotally supporting said link pin upon said vehicle, and an adjusting connection between said bar and pole.

5. In combination with a vehicle, a draft pole pivotally supported at its inner end upon said vehicle and an adjusting bar pivotally supported on said vehicle alongside said pole, an adjustable connection between the pivotally supported ends of said pole and bar, and an adjusting connection between said pole and bar forward of said pivotal support.

6. In combination with a vehicle, a draft pole having vertical pivotal support at its inner end upon a coupling, said coupling having horizontal pivotal support upon the vehicle, an adjusting bar arranged alongside said pole and having vertical pivotal support upon a second coupling, said coupling being pivotally supported upon said vehicle, and an adjustable connection between said couplings.

7. In combination with a vehicle, a draft pole having vertical pivotal support at its inner end upon a coupling, said coupling having horizontal pivotal support upon the vehicle, an adjusting bar arranged alongside said pole and having vertical pivotal support upon a second coupling, and said coupling being pivotally supported upon said vehicle, and an adjustable connection between said couplings, comprising a cross bar slidably supported in one of said couplings and anchored in the other coupling.

In testimony whereof I affix my signature in presence of two witnesses.

PAUL HANSMANN.

Witnesses:
 H. SWANSON,
 H. S. JOHNSON.